(12) United States Patent
Conorich et al.

(10) Patent No.: US 6,302,728 B1
(45) Date of Patent: Oct. 16, 2001

(54) PATCH PANEL WITH REVERSE CORDAGE EXIT PATCH CORD

(75) Inventors: Theodore A. Conorich, Lake Hiawatha, NJ (US); Leonard H. Drexler; Ronald L. Wild, both of Carmel, IN (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/222,504

(22) Filed: Dec. 29, 1998

(51) Int. Cl.[7] .............................. H01R 13/72; H01R 4/24; H01R 4/26; H01R 11/20
(52) U.S. Cl. ............................................. 439/501; 439/404
(58) Field of Search .................................. 439/501, 593, 439/108, 374, 404

(56) References Cited

U.S. PATENT DOCUMENTS

| | | | |
|---|---|---|---|
| 4,606,595 | * | 8/1986 | Dola ..................................... 339/99 R |
| 4,611,875 | * | 9/1986 | Clarke et al. ......................... 439/638 |
| 4,990,094 | * | 2/1991 | Chandler et al. .................... 439/108 |
| 5,718,604 | * | 2/1998 | Conorich et al. ...................... 439/49 |
| 5,906,517 | * | 5/1999 | Crane et al. .......................... 439/654 |

* cited by examiner

Primary Examiner—Brian Sircus
Assistant Examiner—Chandrika Prasad
(74) Attorney, Agent, or Firm—Thomas, Kayden, Horstemeyer & Risley, LLP

(57) ABSTRACT

A patch panel with reverse cordage exit patch cord incorporates a plurality of jacks, with each of the jacks having a plug-receiving cavity formed therein. The jacks are mounted to the patch panel so that their respective plug-receiving cavities are oriented away from the mounting surface to which the panel is mounted. In a preferred embodiment, the patch panel incorporates patch cords with cordage extending from their respective patch cord plugs in a first direction. Each patch cord plug is adapted to matingly engage a plug-receiving cavity of a patch panel jack when the patch cord plug is inserted into the plug-receiving cavity in the first direction. Thus configured, the cordage of the patch cord is directed toward the mounting surface when the plug of the patch cord engages the plug-receiving cavity of the patch panel.

18 Claims, 7 Drawing Sheets

PATCH PANEL WITH REVERSE CORDAGE EXIT PATCH CORD

FIELD OF THE INVENTION

The present invention relates to patch panels for communications use and, more particularly, to patch panels which direct the cordage of their associated patch cords toward the mounting surfaces to which the patch panels are mounted.

DESCRIPTION OF THE RELATED ART

In buildings and, more particularly, within communications connection closets in buildings, various transmission media typically are connected to each other and to incoming and outgoing lines by means, such as connectors, which are mounted to patch panels. Patch panels generally are mounted within a communications closet, such as to a wall or other mounting surface, and incorporate a series of connectors for interconnecting the various transmission media. Transmission media, such as copper wires formed into patch cords, for instance, often incorporate plugs at their ends for facilitating electrical connections. These plugs are configured for mating with, for example, the plug-receiving cavities of jacks, which commonly serve as connectors for patch panels.

Heretofore, it has been commonplace to orient patch panel jacks within a patch panel so that the plug-receiving cavities of the jacks face forward, e.g. away from the mounting surface to which the patch panel is mounted. So configured, the plugs of patch cords typically have an insertion direction into the plug-receiving cavity of a patch panel jack that is perpendicular with and toward the mounting surface of the patch panel, thereby providing a technician with convenient access for connecting the plugs to and removing the plugs from the various jacks. However, since patch cord cordage typically exits its plug at a direction which is approximately 180 degrees from its jack insertion direction, the aforementioned patch panel configuration presents patch cord cordage which extend away from the patch panel jacks and the patch panel mounting surface. The patch cord cordage then tend to hang downwardly in front of the patch panel. When carefully dressed, these patch cords appear neat and orderly and can facilitate efficient patching efforts by a technician, because the patch cords and their associated jacks are readily accessible. However, when the patch cords are not carefully dressed, a general appearance of disorder can result as the cordage inherently tend to form loops in front of the jacks. In extreme cases, the cordage may become entangled or snarled with adjacent cordage, thereby potentially hindering a technician's patching efforts.

In an effort to alleviate the aforementioned problem of patch cord cordage becoming entangled in front of the jacks of a patch panel, a typical prior art solution includes installing a series of raceway brackets between the rows of patch panel jacks. Typically, the raceway brackets are arranged at spaced intervals across the width of the patch panel so that patch cord cordage hanging from a patch panel jack located thereabove may be supported in a trough which is formed by the raceway brackets. This technique, however, increases the production costs of each panel in proportion to the material and production costs for each raceway bracket used and the labor associated with fastening the raceway brackets to the prior art patch panels.

Therefore, there is a need to provide an improved patch panel which addresses these and other shortcomings of the prior art.

BRIEF SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention is generally directed to an improved patch panel which reduces the tendency for patch cord cordage to entangle or snarl in front of the jacks of the patch panel. In a preferred embodiment, the patch panel incorporates a plurality of jacks with each of the jacks including a plug-receiving cavity. The jacks are mounted to the patch panel so that their plug-receiving cavities are oriented away from the mounting surface to which the panel is mounted. The patch panel incorporates patch cords which are adapted to matingly engage the plug-receiving cavities of the patch panel jacks when the patch cord plugs are inserted into the plug-receiving cavities in a first direction. Additionally, the patch cord plugs include cordage which extend from their respective patch cord plugs in the first direction. Thus configured, patch cord cordage extending from their respective plugs are directed toward the mounting surface when the plugs engage the plug-receiving cavities.

In accordance with another aspect of the present invention, an improved patch cord for use in a patch panel is presented. Typically, the patch panel utilizing the improved patch cord incorporates jacks which include plug-receiving cavities oriented away from the mounting surface of the patch panel. The patch cord includes a plug and cordage, with the plug incorporating a first portion insertable into a plug-receiving cavity of a jack in a first direction. The plug also includes a second portion configured to receive the cordage such that the cordage extends from the plug in a second direction. So configured, when the plug engages the plug-receiving cavity of a jack, the cordage is directed toward the mounting surface of the patch panel. In preferred embodiments, the plug includes a jack interface housing and a strain relief housing, with the strain relief housing incorporating a patch cordage-receiving cavity for receiving the cordage. The jack interface housing preferably is mounted to the strain relief housing adjacent the patch cordage-receiving cavity.

Another aspect of the present invention includes providing a patch panel which directs its patch cord cordage into a shadowed raceway, thereby preventing the cordage from entangling with other cordage in front of the jacks of the patch panel. In a preferred embodiment, the shadowed raceways are formed between adjacent vertically displaced rows of mounting brackets which are incorporated into the patch panel for mounting the jacks thereto. Typically, the mounting brackets extend outwardly from the mounting surface and provide an upper surface for forming a support segment of the raceway, and a lower surface to which a jack is mounted. A channel preferably is formed in the front of the brackets for retaining cables and cordage within the raceways, but which is of sufficient size and shape to allow a technician to place cordage through the channel and into the raceway.

In accordance with another aspect of the present invention, a patch cord adapter is presented for use in "pulling" patch cords (e.g. removing a previously connected and dressed patch cord from a patch panel). In a preferred embodiment, the adapter incorporates a tapered body which includes a cordage-receiving channel and a plug-mating cavity. The cordage-receiving channel is formed to engage the cordage of a patch cord such that when the plug-mating cavity engages the plug of the patch cord, the plug is retained in close proximity to its cordage. So configured, the adapter substantially reduces the tendency of the plug to separate from its cordage and snag other cordage or cables as the plug end of the patch cord is pulled through a patch panel.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
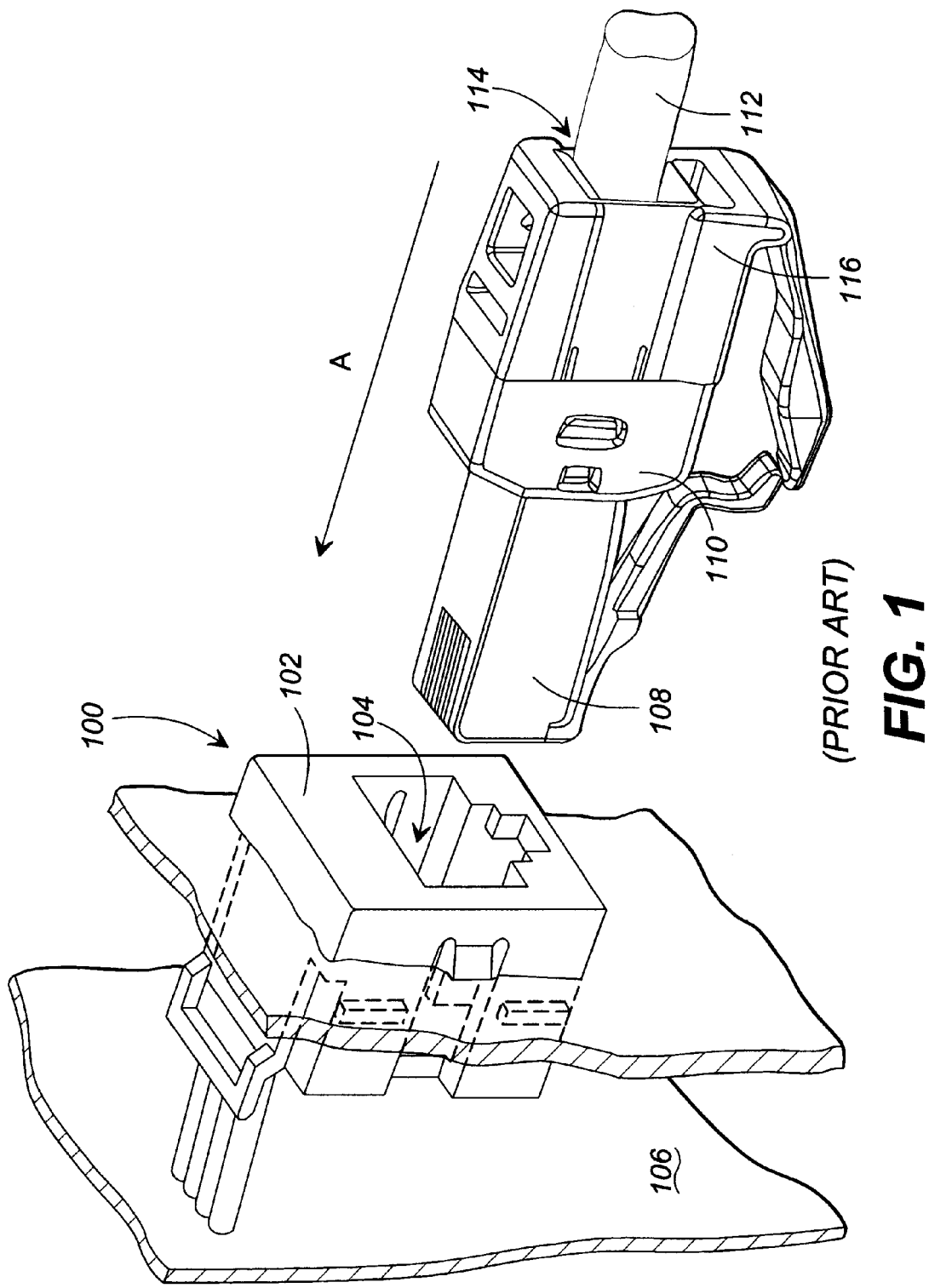
FIG. 1 is a partially cut-away, partially exploded, perspective view of a prior art patch panel showing detail of a jack and patch cord plug.

Reference will now be made in detail to the description of the invention as illustrated in the drawings, wherein like reference numbers indicate like parts throughout the several views. FIG. 1 shows a representative portion of a typical prior art patch panel 100. Prior art patch panel 100 incorporates a plurality of jacks 102 (one of such jacks being shown in FIG. 1) for interconnecting a series of transmission media, such as cables, patch cords, etc. Jack 102 incorporates a plug-receiving cavity 104 and is arranged within its panel 100 so that the plug-receiving cavity 104 faces away from patch panel mounting surface 106, i.e. a wall. Cavity 104 is adapted to engage the front end 108 of a plug 110 when the front end 108 of the plug is inserted into cavity 104 in direction A. Plug 110 electrically communicates with cordage 112 which engages the plug through a cordage-receiving cavity 114 arranged at the rear end 116 of the plug. So configured, cordage 112 extends away from jack 102 and away from mounting surface 106 (e.g., in a direction opposite to that of the insertion direction A) when plug 110 is engaged within the plug-receiving cavity 104 of jack 102. The cordage 112 then hangs downwardly from the plug 110.

As mentioned hereinabove, the cordage 112 of adjacent patch cords connected to a prior art patch panel may become entangled as the cordage extend in front of and hang below their respective jacks. Thus, the prior art patch panel 100 may reduce the efficiency of a technician while the technician attempts to perform patching functions and, otherwise, can tend to form a disorderly appearance if the patch cords are not properly dressed.

Figure 2:
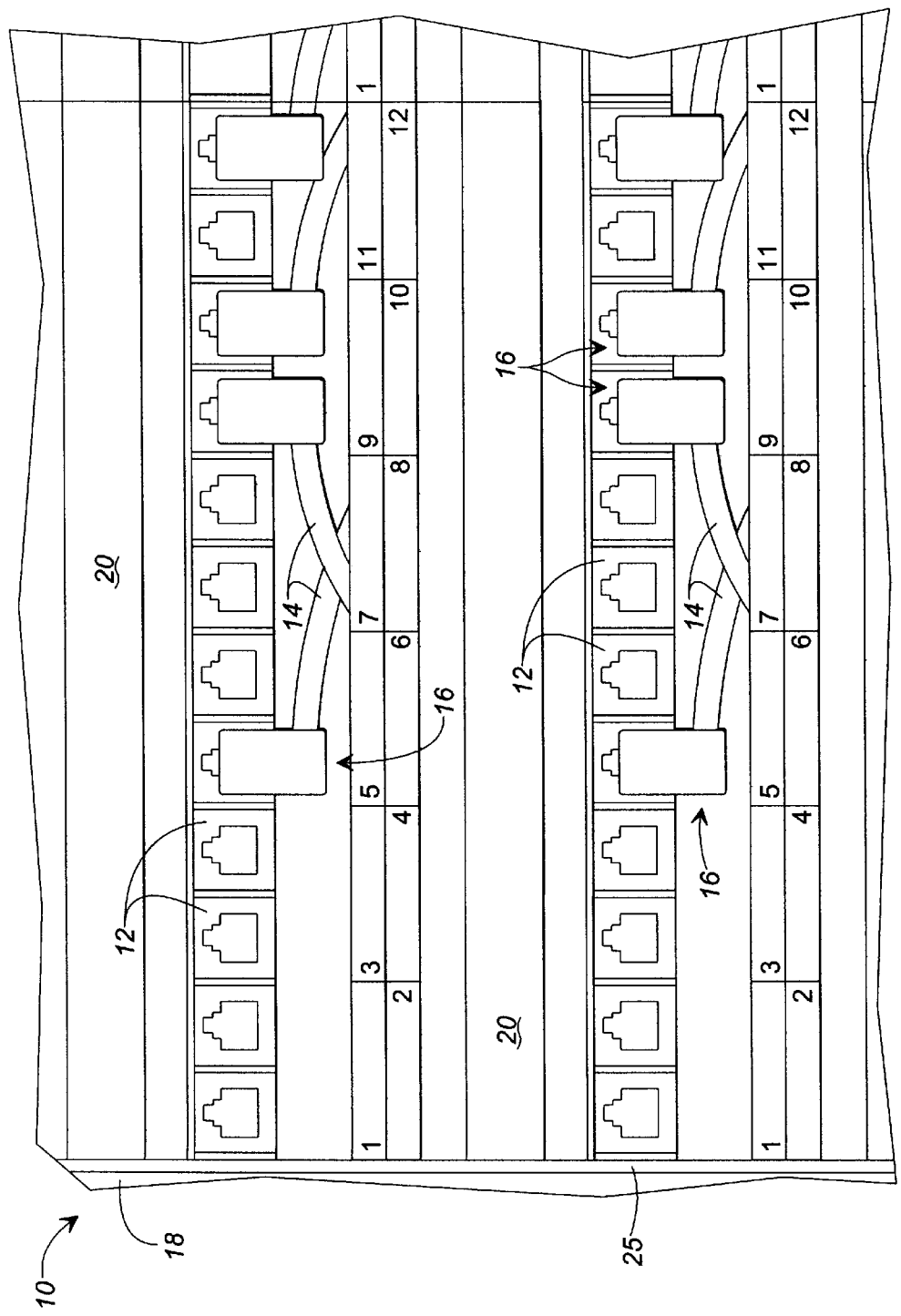
FIG. 2 is a front view of a preferred embodiment of the patch panel of the present invention.
Figure 3:
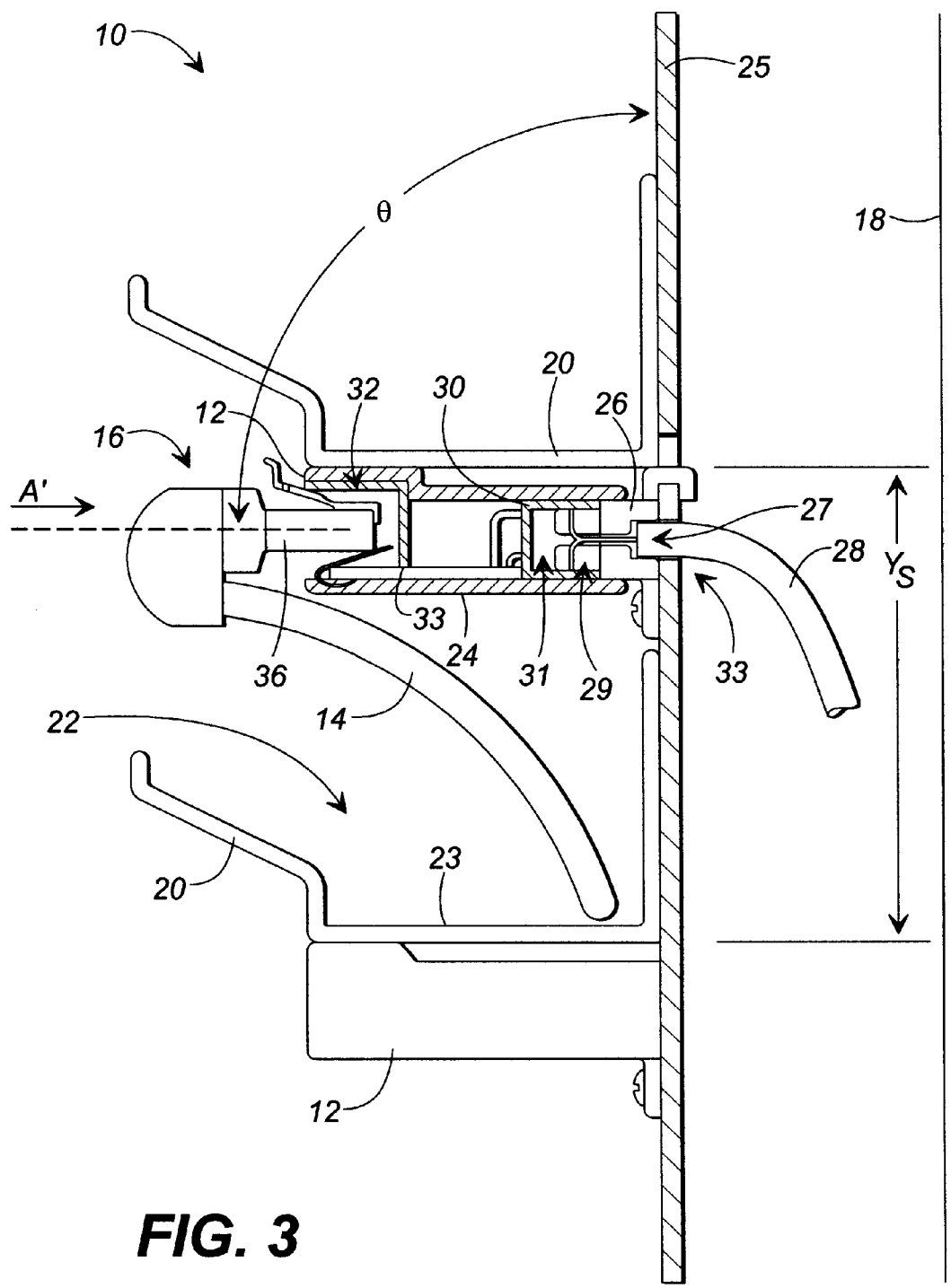
FIG. 3 is a partially cross-sectional side view of the embodiment of the patch panel shown in FIG. 2, showing detail of the patch cord and jack.

As shown in FIGS. 2 and 3, a preferred embodiment of the patch panel 10 of the present invention incorporates a series of jacks 12 which are configured to accept patch cords 16 so that the cordage 14 of the patch cords 16 are directed toward the mounting surface 18 of the patch panel 10. Patch panel 10 includes one or more jack mounting brackets 20 which each can incorporate a series of jacks 12, with the jacks preferably being arranged in a side-by-side relationship across the width of each mounting bracket 20. In some embodiments, however, only one (1) jack is incorporated per bracket 20. So configured, the single-jack brackets (not shown) are arranged in a side-by-side relationship, thereby providing a patch panel which allows a technician to conveniently remove and replace an individual jack 12 by detaching its associated bracket 20, and then replacing it with a replacement bracket and its associated jack.

For patch panels 10 incorporating more than one mounting bracket 20, the brackets typically are spaced vertically from each other in order to form a space or raceway 22 therebetween for accommodating the passage of cordage therethrough. In particular, a raceway 22 is formed between the upper surface 23 of a lower bracket 20 and the lower surface 24 of a jack 12 (described in greater detail hereinbelow) which is mounted to the lower surface of an upper bracket 20. So configured, the upper surface of the lower mounting bracket provides a support surface to support cordage as they extend through the raceway. A vertical spacing ($Y_s$) between brackets of approximately 3.2 inches (e.g., a vertical pitch of 3.75 rows per foot) has been found suitable for typical applications; however, the vertical spacing between brackets may be adapted depending on the particular application, such as, for instance, utilizing a spacing of 3.5 inches so that the brackets can attach to existing patch panels.

Some embodiments of the patch panel 10, incorporate a housing or frame 25. In these embodiments, jack mounting brackets 20 typically are mounted to the frame 25 with the frame then being mounted to mounting surface 18. However, for those embodiments which do not incorporate a frame, the mounting brackets 20 typically are fastened directly to a wall or other mounting surface 18. Attachment of the brackets 20 is accomplished by any suitable means, including, for example, mechanical fasteners, such as screws, bolts, rivets, etc.

As shown in FIG. 3, patch cord plug 16 is inserted into a jack in a direction which is toward the mounting surface 18, e.g. direction A'. In preferred embodiments of the patch panel 10, the insertion direction A' is arranged such that the angle (θ) formed between the insertion direction A' and the mounting surface 18 (or alternatively, the frame 25, or a vertical plane) is between 0 and 180 degrees, preferably between 45 and 135 degrees, and most preferably approximately 90 degrees.

Typically, cable 28 enters a patch panel 10 through a hole which is formed through frame 25 or mounting surface 18, depending on the particular patch panel configuration. As shown in FIG. 3, a 110 style line cable connector 26 is mounted to frame 25 adjacent the hole and provides a plug 29 which extends outwardly from the frame. Cable 28 enters a cable-receiving cavity 27 formed in cable connector 26 and engages the plug 29. A jack module 30 is also provided which incorporates a connector-receiving cavity 31 for receiving the plug 29, and one or more conventional RJ45 connections (not shown) at its distal end. A jack 12, which is preferably in the form of a conventional RJ45 modular jack, also includes a plug-receiving cavity 32 which is adapted to receive the plug 36 of a patch cord 16. Jack module 30 preferably snap fastens to cable connector 26, thereby facilitating the mechanical connection of the jack 12 to cable connector 26. Additionally, a circuit board 33 spans between jack 12 and cable connector 26, thereby facilitating the electrical connection of the jack and cable connector 26.

Figure 4A:
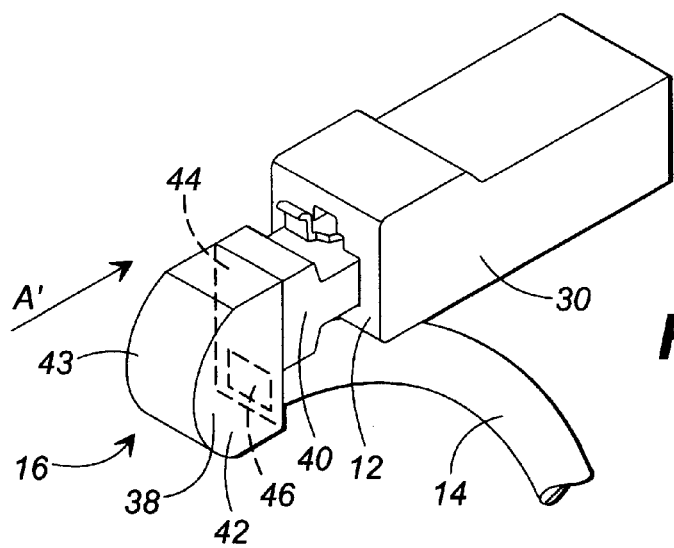
FIG. 4A is a perspective view of a preferred embodiment of the mounting bracket and jack with a representative patch cord attached thereto.
Figure 4B:
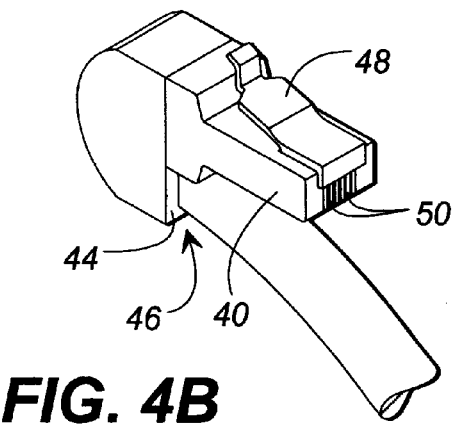
FIG. 4B is a perspective view of the embodiment of the patch cord shown in FIG. 4A, showing detail of the jack interface housing.

As shown in FIG. 4A, jack module 30, which is preferably molded from a dielectric material, such as ABS (acrylonitrile butadiene styrene), among others, is configured for mounting plugs 36 of patch cords 16. Each patch cord 16 preferably includes at least one patch cord plug 36 (including a strain relief housing 38 and a jack interface housing 40), and cordage 14 attached to the patch cord plug. In the embodiment shown in FIGS. 4A and 4B, strain relief housing 38 incorporates side walls 42, end wall 43 and connection face 44. Connection face 44 provides a mounting surface for the base of jack interface housing 40. Connection face 44 also has a patch cordage-receiving cavity 46 formed therein for receiving cordage 14. As shown, an end portion of jack interface housing 40 is received within the plug-receiving cavity 32 of jack 12 in direction A'. Likewise, cordage 14 extends from patch cordage-receiving cavity 46 in direction A' prior to bending downwardly from strain relief housing 38. In the preferred embodiment of FIG. 4, jack interface housing 40 is attached to strain relief housing 38 with latch 48 positioned opposite cordage-receiving cavity 46, in order to facilitate convenient latching and unlatching of the latch.

Figure 5:
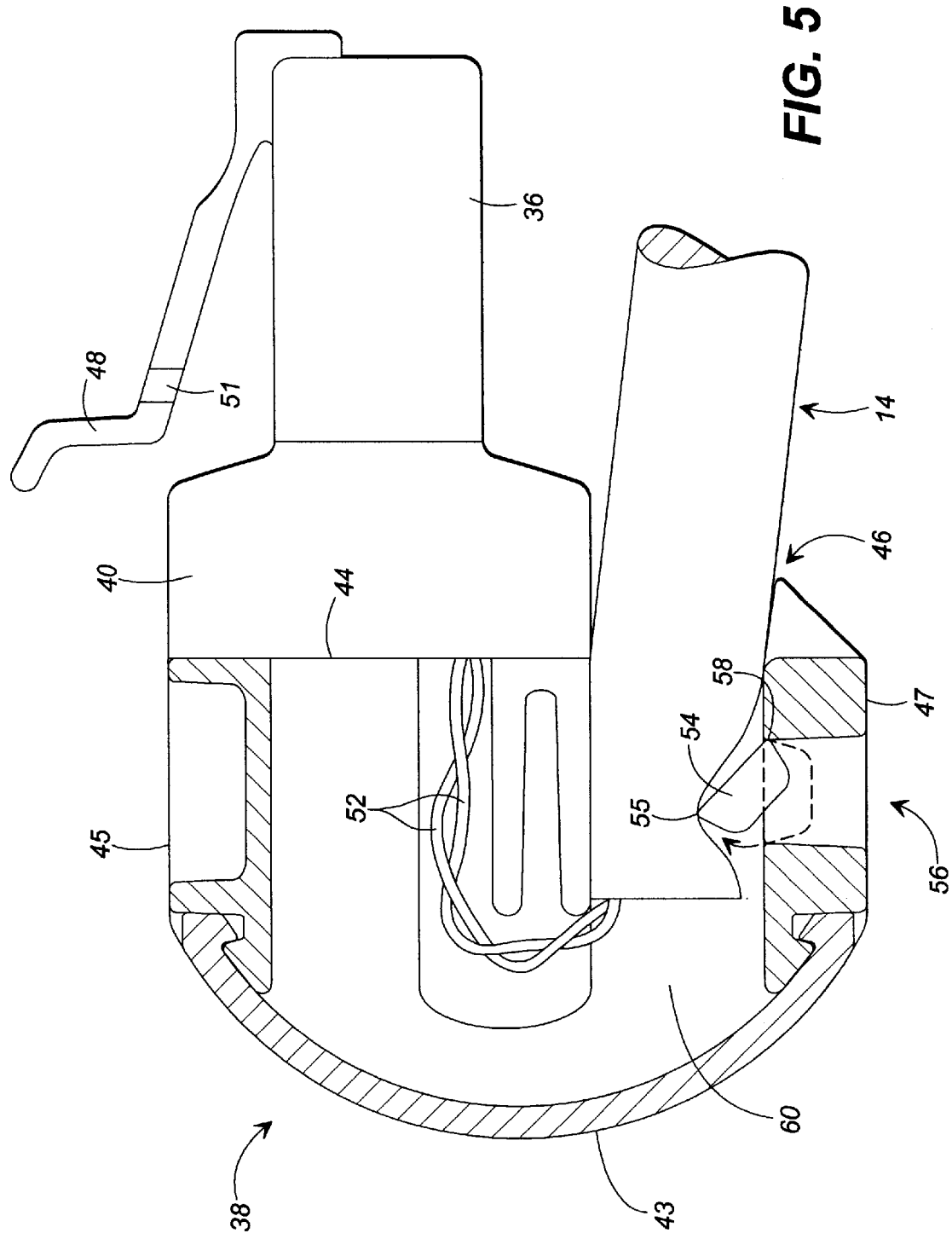
FIG. 5 is a cross-sectional side view of a preferred embodiment of the patch cord plug of the present invention.

As shown in greater detail in FIG. 5, the preferred embodiment of the patch cord plug 36, which is suitable for use in the patch panel 10 of the present invention, includes two major housing components: strain relief housing 38 and jack interface housing 40. Jack interface housing 40 incorporates a substantially hollow shell including side walls and upper and lower walls, and contains a plurality of slots 50 (FIG. 4B) in one end for receiving jack springs (not shown), which are contained within the plug-receiving cavities 32 of jack module 30. The number of slots 50 and dimensions of jack interface housing 40 is dependent upon the number of conductors to be terminated and/or connected, and the shape of the plug-receiving cavity 32. For most applications, the general shape of jack interface housing 40 remains consistent with the number of slots, and the overall width thereof varies in relation to the number of conductors. As shown in FIG. 5, jack interface housing 40 is attached to connection face 44 of strain relief housing 38 such that conductors 52 of cordage 14 enter the hollow shell of the jack interface housing 40.

To secure plug 36 to a jack, jack interface housing 40 includes resilient latch 48 extending from its upper surface. When jack interface housing 40 is inserted into a plug-receiving cavity 32, pressure can be applied to latch 48 by a technician for easy entry of the interface housing 40 within the plug-receiving cavity 32 and then latch 48 can be released, thereby allowing latch 48 to return to a locking position so that latch plates 51 engage behind the front plate of a jack 12.

As described hereinbefore, strain relief housing 38 includes, in a preferred embodiment, opposing side walls 42, curved end wall 43, connection face 44, and upper and lower walls 45 and 47, respectively. Strain relief housing 38 is adapted to receive cordage carrying conductors to be terminated through patch cordage-receiving cavity 46 formed in a lower portion of connection face 44. Cavity 46 may take on numerous configurations, i.e., a rectangular configuration, or a circular configuration, among others, depending on the particular type of cordage to be terminated. Additionally, strain relief housing 38 provides strain relief for the terminated cordage 14 via an anchor bar 54. Anchor bar 54, which includes a surface 55 for engaging the cordage 14, is initially disposed in opening 56 which is preferably formed in lower wall 47. As shown in FIG. 5, when anchor bar 54 is in its inoperative position (represented in ghost), bar 54 is supported within opening 56 via hinge 58 and temporary side tabs (not shown) extending from the inner walls of opening 56. When cordage 14 is placed within patch cordage-receiving cavity 46 and is ready to be secured, a downward force is applied by a technician to anchor bar 54 such that the bar 54 disengages the side tabs and pivots about hinge 58 until it enters cordage passage 60 and engages the cordage 14. In this operative position, surface 55 enters into engagement with the cordage jacket so that the cordage 14 is firmly held within cordage passage 60, thereby effectively preventing relative movement between the strain relief housing 38 and cordage 14 (although the structural integrity of the cordage is not unduly distressed).

As conventionally known by one of ordinary skill in the art, plug 36 contains standard tunable blades and blade carriers for completing electrical communication connections between cordage 14 and jack module 30. However, these components and their corresponding locations within a plug 36 are beyond the scope of this discussion.

Figure 6:
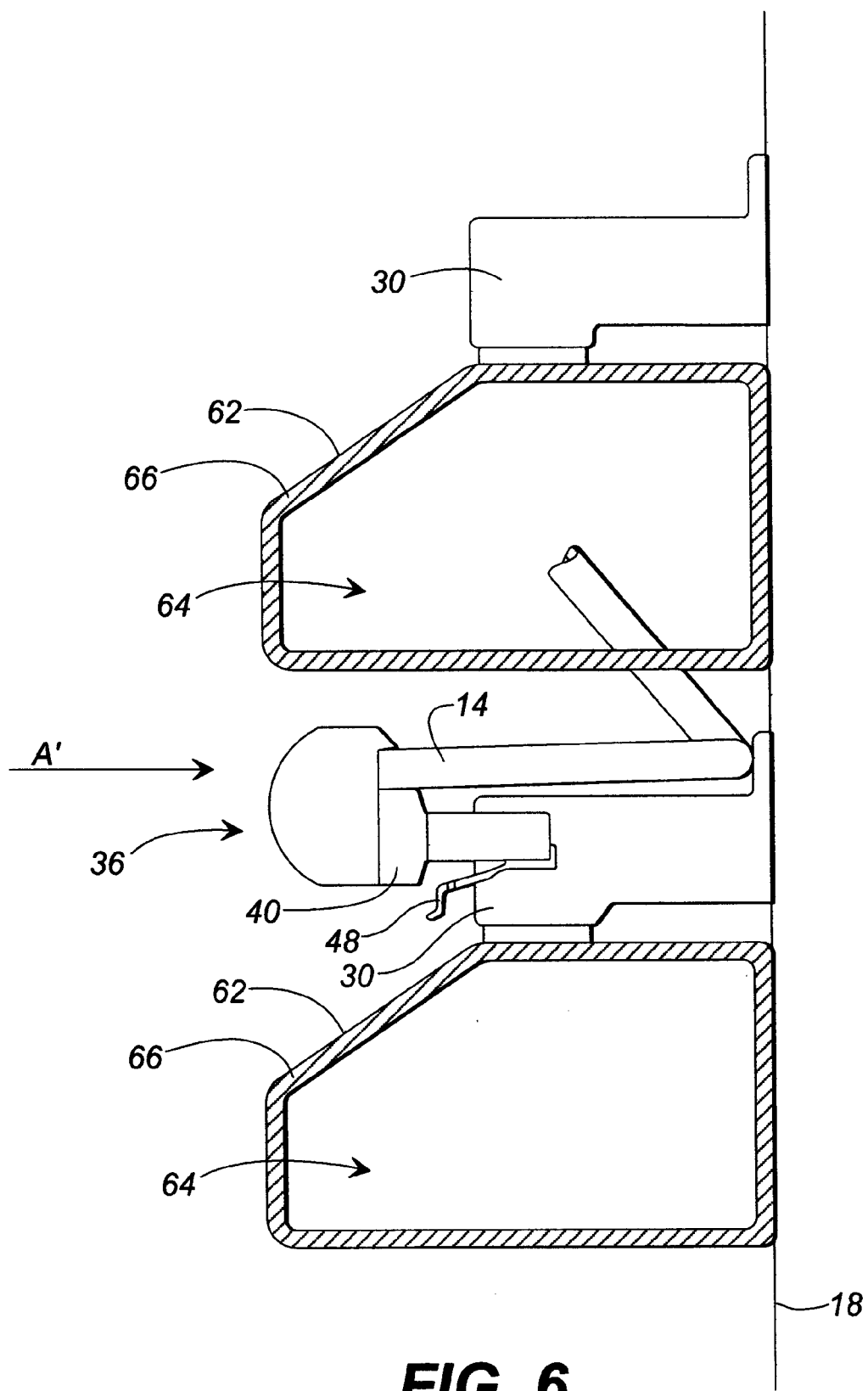
FIG. 6 is a cross-sectional side view of an alternative embodiment of the patch panel of the present invention.
Figure 7:
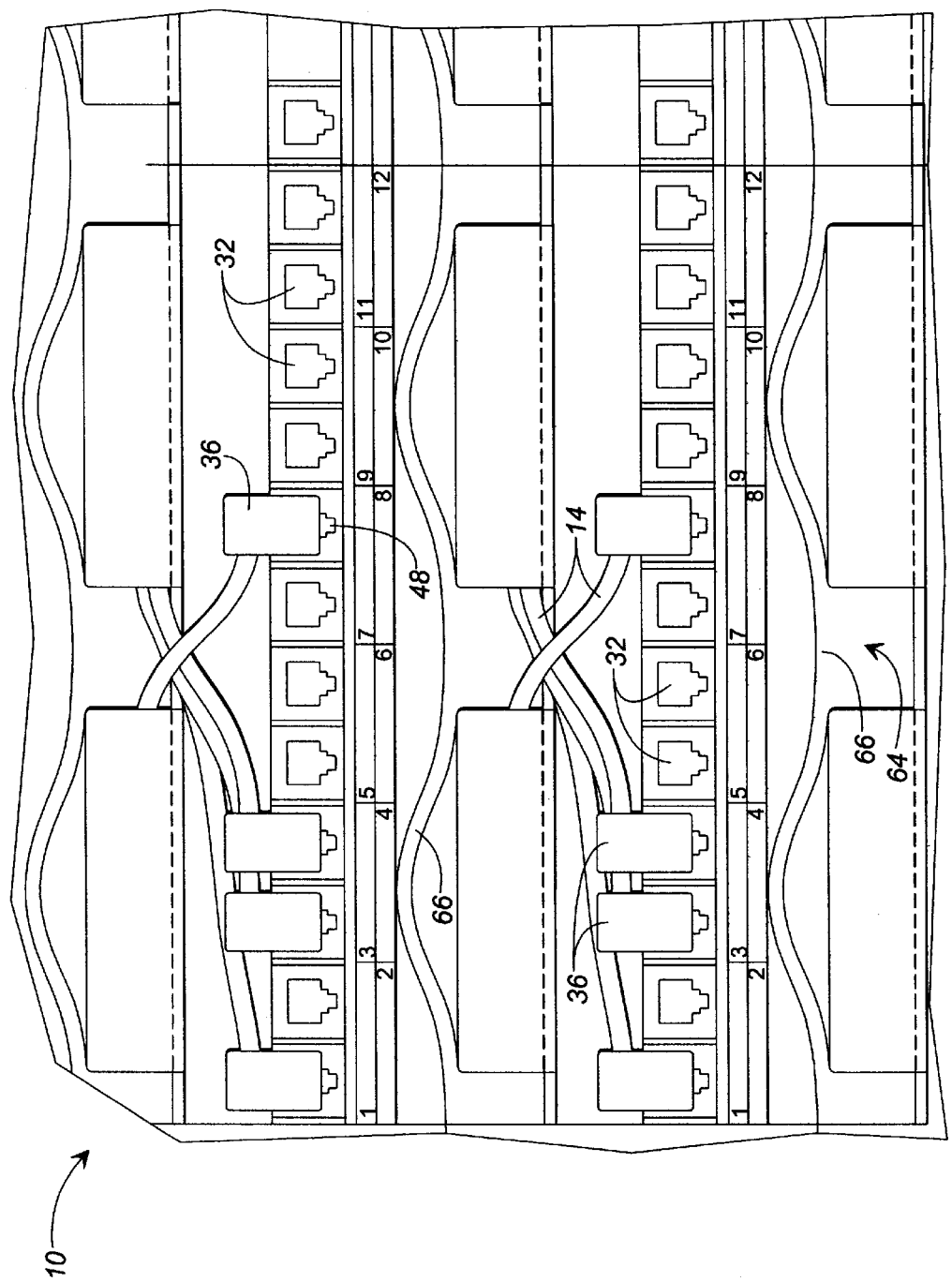
FIG. 7 is a front view of the embodiment of the patch panel shown in FIG. 6.

An alternative embodiment of the patch panel 10 is shown in FIGS. 6 and 7, wherein the jack modules 30 of the panel 10 are mounted above, and preferably to, the upper surface of mounting brackets 62. As shown in FIG. 6, the jacks preferably are mounted to their respective brackets 62 so that a plug 36 which is inserted into plug-receiving cavity 32 of the jack is oriented with its cordage 14 positioned above its jack interface housing 40. So configured, cordage 14 extending from strain relief housings 38 is directed toward mounting surface 18 with the cordage, at least initially, being in close proximity to the uppermost surface of the jack 12. This configuration also places the connector springs (not shown) of the jacks at the top of the plug-receiving cavity 32, thereby improving the resistance of the jacks to dust deposits. Thereafter, the cordage 14 are directed into a raceway 64 which is formed within a central portion of a mounting brackets 62 located thereabove.

As shown in FIG. 6, each bracket 62 can incorporate a channel 66 through which cordage 14 is placed for entry into a raceway 64. The channel is preferably curved or serpentine in configuration, although other configurations may be utilized, and is preferably formed at the front of the bracket. The channel 66 allows a technician to place cordage through the channel and into the raceway; however, channel 66 does not provide a sufficient opening for cordage 14 to fall from or, otherwise, depart the raceway 64 until the cordage is physically removed by a technician. So configured, the front of the panel (FIG. 7) provides a neat and orderly appearance and, thereby, promotes efficient patching efforts by a technician, because the patch cord cordage are prevented from dangling in front of the plug-receiving cavities of the jacks, and their tendency to entangle or snarl in front of the panel is, likewise, reduced.

As is well known in the art, the plug bearing ends of patch cords typically are pulled through the various portions of a patch panel by a technician as the technician performs patching operations. Heretofore, this typically has not presented many inherent problems, such as damaging the patch cords, because the plug of a patch cord typically extends in a linear configuration from the end of its respective cordage. So configured, there is a reduced tendency for the plug to snare on patch cords which were previously attached to a patch panel because the plug of the patch cord being pulled through the patch panel served as a probe or wedge for forming a space between the attached patch cords. However, it has been found that the patch cord plug of the present invention, which incorporates a jack interface housing that is arranged in a non-linear configuration relative to its cordage, may snag on patch cords within a patch panel during patching operations. Therefore, an adapter 68 (FIG. 8) is presented which mates with the strain relief housing of the patch cords 38 in order to alleviate the aforementioned problem.

Figure 8:
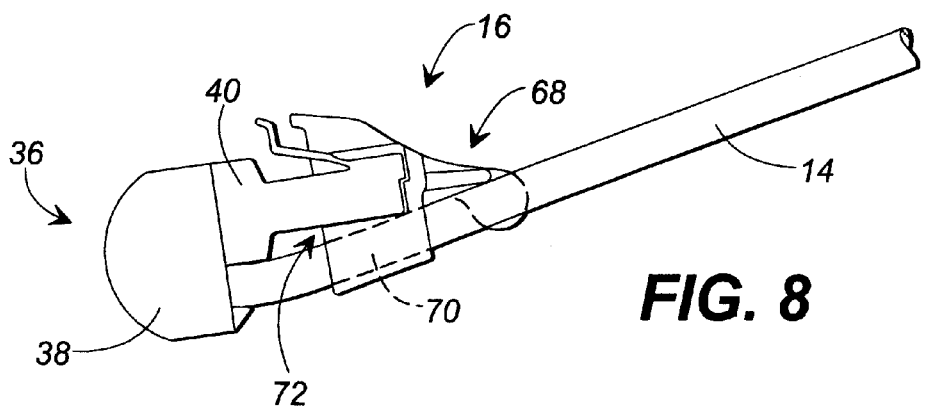
FIG. 8 is a side view of a preferred embodiment of an adapter that is used for pulling a patch cord through a patch panel.

As shown in FIG. 8, adapter 68 incorporates a tapered configuration and includes a cordage-receiving channel 70 formed therethrough and a plug-mating cavity 72 arranged adjacent the channel 70 at the widened, rear end of the adapter. By placing cordage 14 of a patch cord within the cordage-receiving channel 70 and then engaging the jack interface housing 40 of the patch cord within the plug-mating cavity 72, the jack interface housing 40 is retained in close proximity to cordage 14, thereby preventing the jack interface housing from being snagged and pulled away from its cordage during patching operations.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

We claim:

1. A patch panel system for mounting to a generally vertical mounting surface and for use in connecting patch cords to cables, the patch cords each extending from the generally vertical mounting surface, said patch panel comprising:
    a plurality of jacks, each of said jacks having a plug-receiving cavity formed therein, each of said plug-receiving cavities oriented so as to open away from the generally vertical mounting surface; and
    at least one patch cord plug configured to be received in one of said plug receiving cavities, said patch cord plug having a first portion insertable into said plug-receiving cavity in a first direction toward the generally vertical mounting surface and having a second portion configured to receive cordage of one of the patch cords such that the cordage of the patch cord extends into said plug in a second direction away from the generally vertical mounting surface when the plug engages said plug-receiving cavity.

2. The patch panel system of claim 1, wherein said first direction is oriented toward the mounting surface.

3. The patch panel system of claim 1, wherein said jacks are arranged in vertically spaced rows, each of said vertically spaced rows having a plurality of said jacks.

4. The patch panel system of claim 1, wherein each of said jacks has a cable-receiving cavity formed therein and a plug-receiving cavity formed therein, said cable-receiving cavity sized and shaped to receive a cable, said plug-receiving cavity sized and shaped to receive a plug of a patch cord such that the cable electrically communicates with the plug when the plug is received within said plug-receiving cavity.

5. The patch panel system of claim 3, wherein each of said vertically spaced rows has a plurality of said jacks arranged in side-by-side relationship.

6. The patch panel system of claim 3, wherein each of said vertically spaced rows is mounted to a mounting bracket.

7. The patch panel system of claim 4, wherein each of said jacks has a cable connector and a plug connector, said cable connector having a plug connector-receiving cavity and said cable-receiving cavity formed therein, said plug connector having said plug-receiving cavity formed therein and a connector end, said connector end sized and shaped to engage said plug connector-receiving cavity.

8. The patch panel system of claim 6, wherein said mounting bracket forms a raceway, said mounting bracket having a front portion with a channel formed therein such that said channel provides access for cordage to enter said raceway.

9. The patch panel system of claim 7, wherein said cable connector is a 110 style connector, and said connector end of said plug connector is a 110 style plug.

10. The patch panel system of claim 7, wherein each of said mounting brackets has an upper surface and a lower surface, said upper surface forming a raceway such that said raceway is sized and shaped to support cordage, said lower surface mounting at least one of said jacks.

11. The patch panel system of claim 7, wherein each of said mounting brackets has an upper surface and a lower surface, said upper surface and said lower surface defining a raceway therebetween such that said raceway is sized and shaped to support cordage, said upper surface mounting at least one of said jacks.

12. A patch cord for use in a patch panel, the patch panel for mounting to a generally vertical mounting surface and having a plurality of jacks mounted thereto, each of the jacks having a plug-receiving cavity formed therein, each of the plug-receiving cavities oriented so as to open away from the generally vertical mounting surface, said patch cord comprising:
    a length of cordage, and;
    a plug having a first portion insertable into a plug-receiving cavity in a first direction toward the generally vertical mounting surface and a second portion configured to receive said cordage such that said cordage extends into said plug in a second direction away from the generally vertical mounting surface when said plug engages the plug-receiving cavity of a jack mounted to the generally vertical mounting surface.

13. The patch cord of claim 12, wherein said first direction is oriented toward the mounting surface.

14. The patch cord of claim 12, wherein said patch cord plug has a jack interface housing and a strain relief housing, said strain relief housing having a patch cordage-receiving cavity formed therein configured to receive said cordage, said jack interface housing mounted to said strain relief housing, said first portion forming at least a portion of said jack interface housing.

15. The patch cord of claim 14, wherein said patch cordage-receiving cavity is arranged adjacent said jack interface housing.

16. An improved patch cord for use in a patch panel, the patch panel having at least one jack, the jack having a plug-receiving cavity formed therein, said patch cord comprising:

patch cordage having a proximal and a distal end;

a strain relief housing having a patch cordage-receiving cavity formed therein configured to receive one of said ends of said patch cordage, such that said patch cordage extends from said patch cordage-receiving cavity in a first direction, and;

a jack interface housing mounted to said strain relief housing and extending therefrom in said first direction, said jack interface housing sized and shaped to engage a plug-receiving cavity of a jack.

17. The patch cord of claim 16, wherein said strain relief housing has opposing side walls, upper and lower walls, a curved end wall, and a connection face, said patch cordage-receiving cavity formed in said connection face, and said strain relief housing mounted to said connection face.

18. A patch cord adapter for use in patching patch cords within a patch panel, each patch cord having a plug, said adapter comprising:

a tapered body having narrow end, a widened end, a cordage-receiving channel, and a plug-mating cavity, said cordage-receiving channel formed through said body and extending from said narrow end to said widened end, said plug-mating cavity formed in said body at said widened end and arranged such that said plug-mating cavity faces away from said narrow end, said plug-mating cavity sized and shaped to receive a plug of a patch cord.

* * * * *